US012719114B2

(12) United States Patent
Häring et al.

(10) Patent No.: US 12,719,114 B2
(45) Date of Patent: Aug. 25, 2026

(54) HOLDER FOR AN ELECTRODE OF A BUTTON BATTERY AND A BATTERY PROVIDED THEREWITH

(71) Applicant: RENATA AG, Itingen (CH)

(72) Inventors: Pascal Häring, Muttenz (CH); Han Wu, Pembroke Pines, FL (US)

(73) Assignee: RENATA AG, Itingen (CH)

(*) Notice: Subject to any disclaimer, the term of this patent is extended or adjusted under 35 U.S.C. 154(b) by 655 days.

(21) Appl. No.: 17/982,880

(22) Filed: Nov. 8, 2022

(65) Prior Publication Data

US 2023/0148394 A1 May 11, 2023

(30) Foreign Application Priority Data

Nov. 9, 2021 (EP) .................................... 21207278

(51) Int. Cl.
*H01M 50/109* (2021.01)
*H01M 4/76* (2006.01)
*H01M 50/153* (2021.01)

(52) U.S. Cl.
CPC ........... *H01M 50/109* (2021.01); *H01M 4/76* (2013.01); *H01M 50/153* (2021.01)

(58) Field of Classification Search
CPC ..... H01M 10/0422–0427; H01M 10/05–0525; H01M 10/0585; H01M 6/02–085; H01M 6/12–14; H01M 6/162–188; H01M 50/10–102; H01M 50/107–109; H01M 50/131–134;

(Continued)

(56) References Cited

U.S. PATENT DOCUMENTS

2015/0349388 A1* 12/2015 Haering ............ H01M 10/4257 29/623.2

FOREIGN PATENT DOCUMENTS

CN 201717321 U * 1/2011
CN 201773903 U 3/2011

(Continued)

OTHER PUBLICATIONS

Machine translation of Kimura, JP 2006-032313. Originally available Feb. 2, 2006. (Year: 2006).*

(Continued)

*Primary Examiner* — Nicole M. Buie-Hatcher
*Assistant Examiner* — Jacob Buchanan
(74) *Attorney, Agent, or Firm* — Sughrue Mion, PLLC

(57) ABSTRACT

An electrically conductive holder (1') for holding a tablet electrode (4) of a button battery (11') pressed into the holder. The holder includes a bottom portion (3) and at least three supports (20) protruding outward from the bottom portion, the supports being positioned along the circumference of the holder so that the holder is supported by the supports. A wall portion (2) rises upward from the circumference of the bottom portion with the supports protruding from the bottom portion in the direction opposite the wall portion. Also, an assembly including the holder (1') and a battery electrode tablet (4) pressed into the holder, and to a button battery (11') including the assembly, and a method for producing a holder/tablet assembly by a compression process that uses a stamp (6') provided with depressions (22) configured for deforming the bottom portion (3) of the holder during the compression process.

14 Claims, 4 Drawing Sheets

(58) Field of Classification Search
CPC ......... H01M 50/152–153; H01M 50/166–167; H01M 50/183–188; H01M 50/40–409; H01M 50/46; H01M 50/463–466; H01M 50/471–483; H01M 50/531–533; H01M 50/543–545; H01M 50/559–56; H01M 4/76–765
See application file for complete search history.

(56) References Cited

FOREIGN PATENT DOCUMENTS

| | | | | | |
|---|---|---|---|---|---|
| CN | 102315480 | A | * | 1/2012 | .............. H01M 4/74 |
| CN | 102780008 | A | | 11/2012 | |
| CN | 109193023 | A | * | 1/2019 | ............ H01M 50/50 |
| CN | 113013525 | A | | 6/2021 | |
| EP | 2 863 459 | A1 | | 4/2015 | |
| EP | 3 809 484 | A1 | | 4/2021 | |
| JP | 2006032313 | A | * | 2/2006 | ............. Y02E 60/10 |

OTHER PUBLICATIONS

Machine translation of Wang, CN 102315480. Originally available Jan. 11, 2012. (Year: 2012).*
Machine translation of Zhang, CN 109193023. Originally available Jan. 11, 2019. (Year: 2019).*
Machine translation of Chen, CN 201717321. Originally available Jan. 19, 2011. (Year: 2011).*
European Search Report of EP 21 20 7278 dated Apr. 22, 2022.

* cited by examiner

Fig. 1
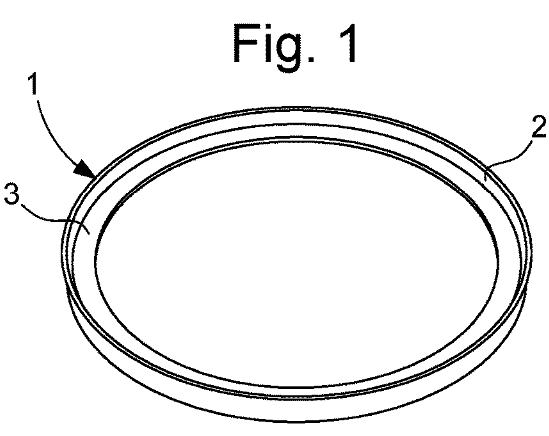
Fig. 2a
4
1
Fig. 2b
4
2
3
1
Fig. 3a Fig. 3b Fig. 3c Fig. 3d
Fig. 3e Fig. 3f Fig. 3g
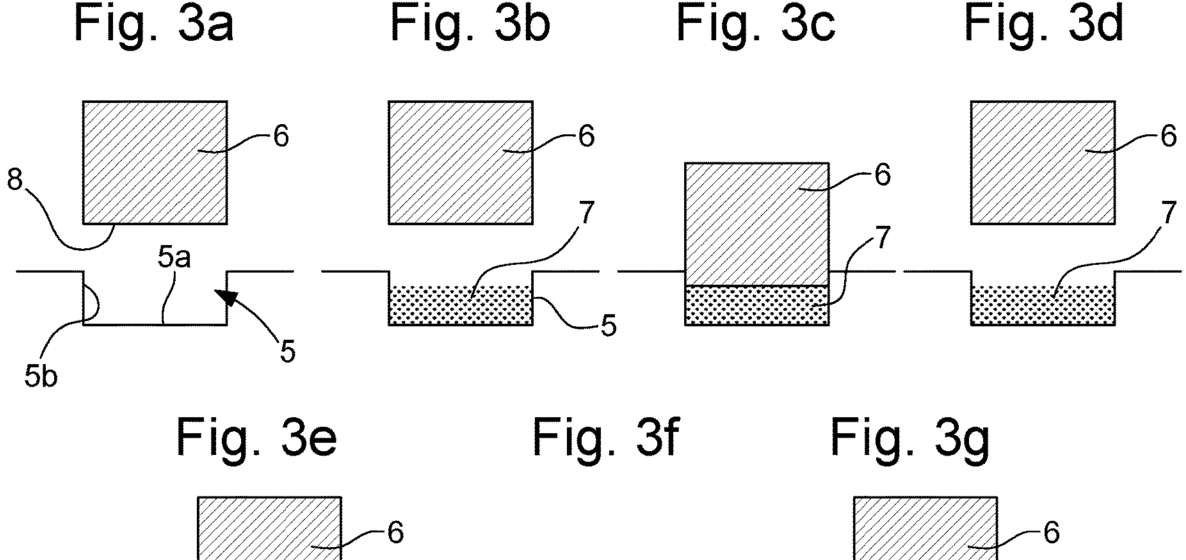

HOLDER FOR AN ELECTRODE OF A BUTTON BATTERY AND A BATTERY PROVIDED THEREWITH

CROSS REFERENCE TO RELATED APPLICATIONS

This application claims priority to European Patent Application No. 21207278.9, filed on Nov. 9, 2021, the entire contents of which are incorporated herein by reference.

FIELD OF THE INVENTION

The present invention is related to button-shaped batteries, in particular to a support means for the cathode of such a battery.

STATE OF THE ART

Button-shaped batteries, also referred to shortly as 'button batteries' or 'button cells' are well known. Various types of button batteries are in use, distinguished by various dimensions and by the materials used for the electrodes and the electrolyte. A commonly used type for low voltage appliances such as wristwatches or the like is often referred to as a 'CR' type battery, the C referring to the chemistry of the electrodes and the R to the round shape of the battery. CR batteries comprise a lithium-based anode and a cathode comprising manganese dioxide as active material. The electrolyte may be a solid or liquid organic material. Other material combinations are known under various other letter codes, such as BR, SR, etc.

The cathode of a CR battery is usually in the form of a tablet produced by compacting a powder mixture comprising the active material, a binder, carbon and/or graphite to reduce the internal resistance, and other additives. According to one well-known technique, the mixture is pressed into the shape of a tablet with a mesh at the bottom. The mesh is added to increase the strength of the tablet and to provide a better electrical contact between the tablet and the metal can which lies under the tablet and which forms the positive terminal of the battery.

During discharge, the tablet expands because of the ingress of lithium ions migrating from the anode. As the amount of lithium ions increases in the tablet, the tablet expands in all directions. Problems resulting from this expansion include:

Losing contact with the mesh: the mesh is pressed onto the tablet without any binding agent. As the tablet expands, the grip on the mesh by the powders becomes looser, and finally the two become separated.

While the tablet expands during discharge, the anode, made of metallic lithium, is consumed. In an ideal situation, the expansion rate of the cathode tablet in the height direction is greater than the rate at which the lithium anode recedes, so that a conductive path between the two electrodes is maintained. However, as there is no restriction in the direction of the tablet's expansion, the tablet not only grows in the height direction, but also in the radial direction. This causes the rate of expansion toward the lithium anode to slow down, eventually leading to a loss of a conductive path between the electrodes.

A known solution to these problems is to apply a metal ring-shaped holder instead of a mesh, with the tablet pressed inside the ring-shaped holder. The holder forms a wall around at least part of the tablet that directs the expansion of the tablet in the height direction only, towards the anode, thus maintaining the conductive path between the anode and the cathode. However, the ring has an open bottom and therefore only substantially supports the tablet along its circumference. For this reason, the tablet is now more likely to expand towards the positive can during discharge, in the direction away from the anode. This expansion pushes itself against the can, and lifts the holder away from the can, resulting in the loss of electrical contact between the cathode and the can.

Other holder designs have been proposed to alleviate these particular problems, including a holder not having an open bottom but provided with a grid on the bottom of the holder, as disclosed for example in patent publication documents CN103606684 and CN203553277. In these latter examples, the grid exhibits a staggered pattern, consisting of parallel strips which are bent repeatedly inward and outward relative to the bottom plane of the holder. The inwardly bent portions of the strips may imbed themselves into the powder during tablet pressing, increasing the strength of the tablet. The outwardly bent portions of the strips are in direct contact with the can of the battery and exhibit a degree of elasticity, which enables maintaining a good contact between the tablet and the can. Also, when a liquid electrolyte is used, the outwardly bent portions provide a space between the can and the bottom of the tablet, where electrolyte can be collected as a reserve.

However, when a tablet is pressed into a holder of this type during the manufacturing process, the force required to press the powders together is applied directly on the inwardly and outwardly bent portions. Unless the holder is made from metals with very high strength, these portions may be flattened, thereby reducing or eliminating the intended beneficial effect of the staggered patterns. In particular, when the outwardly bent portions are flattened during tablet pressing, said space for collecting a liquid electrolyte reserve is eliminated.

SUMMARY OF THE INVENTION

The invention aims to provide a solution to the above-described problems. This aim is achieved by an electrode holder, a holder/tablet assembly and a battery in accordance with the appended claims.

According to the invention, an electrically conductive holder is provided that is suitable for holding a tablet electrode of a button battery pressed into the holder. The holder comprises a bottom portion having a circular circumference. The holder further comprises at least three supports protruding outward from said bottom portion, said supports being positioned along the circumference of the holder in such a manner that the holder may be supported on a planar surface by said supports. The holder may further comprise a wall portion rising upward from the circumference of the bottom portion with the supports protruding from the bottom portion in the direction opposite the wall portion. The invention is equally related to an assembly comprising said holder and a battery electrode tablet pressed into the holder, and to a button battery comprising said assembly. The invention is further related to a method for producing a holder/tablet assembly by a compression process that uses a stamp provided with depressions configured for deforming the bottom portion of the holder during said compression process.

The supports ensure that a space is available between the bottom of the cathode tablet of a button battery and the bottom of the can of the battery. This space allows a degree of expansion of the cathode while also representing a reserve area for the battery's electrolyte. The space is ensured by the supports even when the holder comprises outwardly bent portions, which are flattened during the compression process.

BRIEF DESCRIPTION OF THE FIGURES

FIG. 1 illustrates a ring-shaped holder for the cathode of a CR battery, as known in the prior art.

FIGS. 2*a* and 2*b* illustrate the holder of FIG. 1 with a cathode tablet compressed therein.

FIGS. 3*a* to 3*g* illustrate the steps of the compression process for producing the assembly of a holder and cathode tablet as presently known in the art.

DETAILED DESCRIPTION OF EMBODIMENTS OF THE INVENTION

Figure 4A:
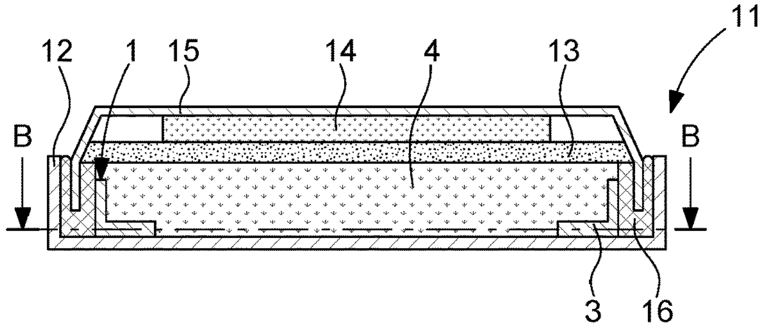
FIGS. 4*a* and 4*b* show two section views of a CR battery with the holder/tablet assembly of FIGS. 2*a* and 2*b* mounted therein.

FIG. 1 illustrates a ring-shaped holder 1 for a round cathode tablet for a CR battery as known in the art and referred to above in the introduction, i.e. a ring with an open bottom. The ring has a bottom portion 3 in the form of a flat ring-shaped strip 3 and a round wall portion 2 rising upward from the circular circumference of the strip 3. The wall portion 2 is preferably perpendicular to the bottom portion 3. The holder 1 is formed of an electrically conductive material, preferably a metal that is mechanically, chemically, and electrochemically stable under the environment inside the battery, for example stainless steels (SS) such as SS304, SS316, aluminium and most precious metals.

FIGS. 2*a* and 2*b* show the same holder 1 with a cathode tablet 4 pressed into said holder, respectively viewed from above and from below. In the latter view, it is seen that the bottom of the ring-shaped strip 3 is level with the cathode tablet 4. This is a consequence of the process by which the tablet assembly shown in FIGS. 2*a* and 2*b* is produced. An example of such a process is schematically illustrated in FIGS. 3*a* to 3*g*. As seen in FIG. 3*a*, the installation for producing the tablet assembly comprises a cavity 5 and a stamp 6 having mutually corresponding cross-sections so that the stamp 6 may be inserted into the cavity 5 with a small clearance. The cavity 5 comprises a planar bottom 5*a* and a round upstanding sidewall 5*b*. The stamp 6 is configured to be pushed by a controlled force into the cavity 5. The cross-section of the cavity 5 corresponds to the cross-section of the ring-shaped cathode holder 1. As seen in FIG. 3*b*, a cathode powder mixture 7 is introduced into the cavity 5, followed by a first compression step (FIG. 3*c*) for lightly pre-compacting the powder 7. Then the stamp 6 is raised again out of the cavity 5 (FIG. 3*d*), and the ring-shaped holder 1 is introduced into the cavity 5, with the bottom side up (FIG. 3*e*). Then the stamp 6 is again pushed down, now with a higher force (FIG. 3*f*), thereby fully compressing the cathode tablet 4 and pressing the cathode material into the ring-shaped holder 1. The stamp 6 is finally raised (FIG. 3*g*), allowing the assembly of the cathode tablet 4 and the ring-shaped holder 1 to be taken out of the cavity 5.

The stamp 6 used for producing this assembly has a flat front surface 8, hence the level bottom surface of the assembly, as illustrated in FIG. 2*b*.

Figure 4B:
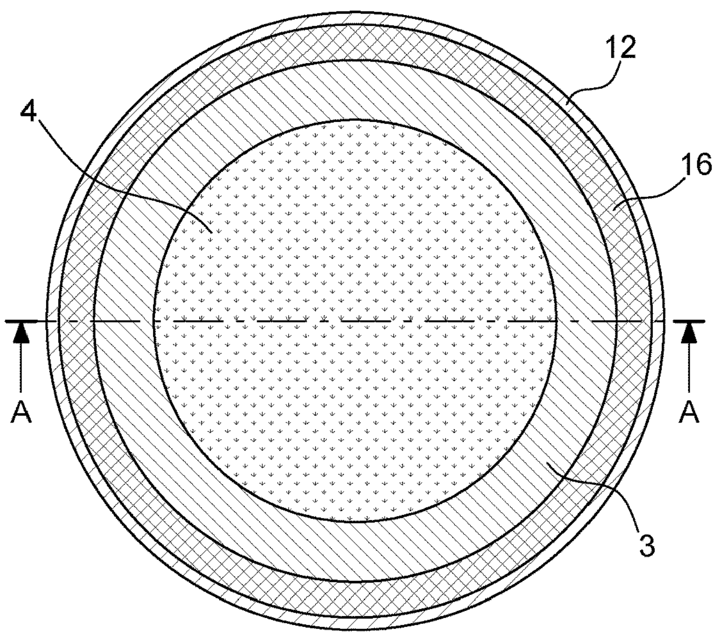

FIGS. 4*a* and 4*b* show a CR battery 11 equipped with the compacted cathode/holder assembly described above. The images represent the battery 11 at the start of its battery life, i.e. before any significant volume change of the electrodes has taken place. The ring-shaped holder 1 sits inside the can 12 that forms the positive terminal of the battery 11, with the ring-shaped strip 3 contacting the bottom of the can 12. As described above, the compacted cathode material 4 is level with the bottom surface of the ring-shaped strip 3, and is therefore in physical contact with the bottom of the can 12.

Above the tablet 4 is a separator sheet 13, that separates the cathode tablet 4 from the battery's anode 14 located on top of the separator sheet 13. The anode 14 is covered by a metal lid 15 that forms the negative terminal of the battery 11. An electrically insulating gasket 16 is inserted between the outer rims of the can 12 and the lid 15, effectively separating the positive and negative terminals and closing off the interior of the battery 11 from the external atmosphere.

The separator 13 may be a sheet of solid electrolyte laminated onto the tablet 4, in which case the tablet 4 also comprises the solid electrolyte mixed together with the active material. Alternatively, the battery 11 may include a liquid electrolyte. In this case, the tablet 4 is soaked in this liquid electrolyte and the separator 13 may be a porous polymeric film that is itself electrically insulating, but that can absorb the liquid electrolyte in order to conduct ions from the anode 14 to the cathode 4.

The disadvantages of the type of ring-shaped holder 1 have been stated in the introduction and may be re-summarized here. When the tablet 4 expands, it is likely to push itself away from the can 12. Also, when a liquid electrolyte is used, no empty space is available between the cathode tablet 4 and the bottom of the can 12, so that no electrolyte reserve can be formed in that area.

Figure 5A:
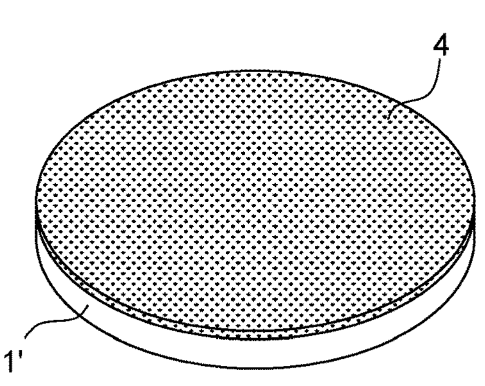
FIGS. 5*a* and 5*b* illustrate a holder/tablet assembly in accordance with an embodiment of the invention.
Figure 5B:
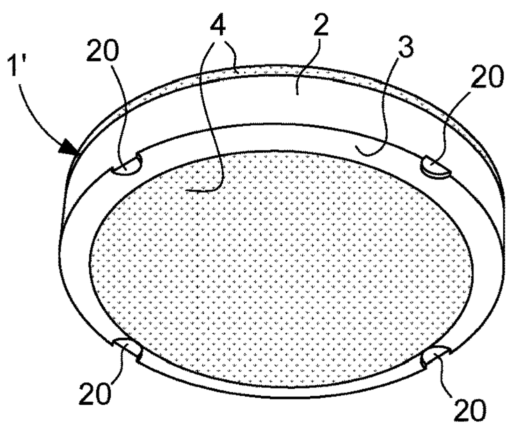
Figure 6A:
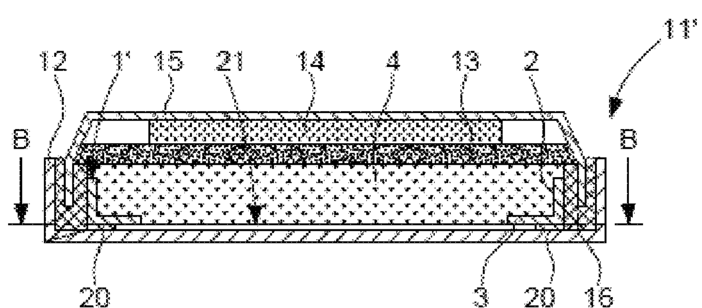
FIGS. 6*a* and 6*b* show two section views of a CR battery with the holder/tablet assembly of FIGS. 5*a* and 5*b* mounted therein.
Figure 6B:
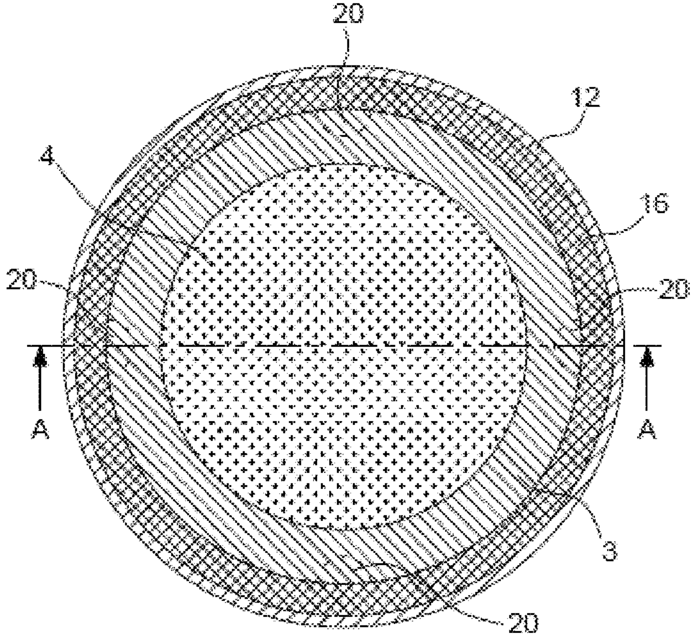

FIGS. 5*a* and 5*b* show a holder/tablet assembly comprising a ring-shaped holder 1' and a compacted cathode tablet 4 in accordance with an embodiment of the invention. The holder 1' again comprises a wall portion 2 and a bottom portion in the form of a ring-shaped strip 3. Viewed from above (FIG. 5*a*), the assembly looks the same as the prior art assembly shown in FIG. 2*a*. The bottom view in FIG. 5*b* shows that the ring-shaped strip 3 is still level with the bottom plane of the compacted cathode 4. However, now the holder 1' is provided with a number of supports 20 which protrude outward from the ring shaped-strip 3 in the direction opposite from the wall portion 2, so as to form support legs for the assembly when said assembly is placed on a planar surface, such as the bottom surface of the can 12 of a CR battery 11' in accordance with the invention, as illustrated in FIGS. 6*a* and 6*b*.

In the embodiment shown, the ring-shaped holder 1' comprises 4 supports 20, placed at angular intervals of 90° along the circumference of the ring-shaped holder 1'. The number of supports 20 may be any realistic number of 3 or more, distributed along the circumference in such a manner that the supports realize a clearance 21 (see FIG. 6*a*) between the bottom of the can 12 and the cathode tablet 4, when the holder/tablet assembly is installed in the can.

According to preferred embodiments, the height of the supports 20 is essentially the same for all the supports, so that the clearance 21 is essentially constant along the surface of the cathode tablet 4, i.e. the bottom of the tablet 4 is essentially parallel to the bottom of the can 12. The clearance 21 allows a degree of expansion of the tablet 4 in the direction of the can 12, without breaking the electrical contact between the holder 1' and the can 12. Also, the clearance 21 may accommodate an electrolyte reserve when a liquid electrolyte is used.

The shape of the supports 20 is not limited to the rounded half-circular shape illustrated in FIG. 5*b*, but may be any other suitable shape.

Figure 7:
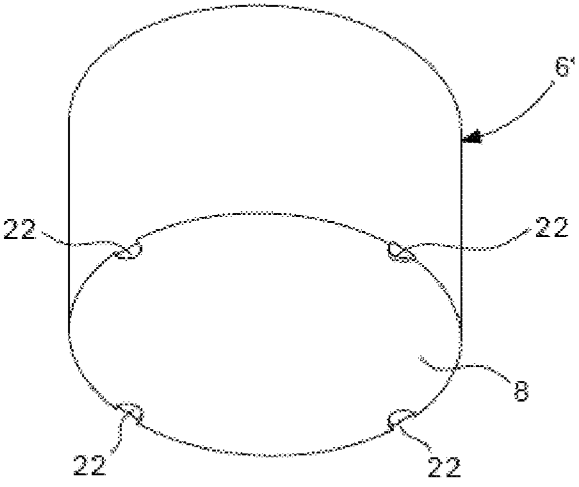
FIG. 7 shows a stamp suitable for producing a holder/tablet assembly in accordance with the invention, using the compression process illustrated in FIGS. 3*a* to 3*g*.

A preferred method for realising the supports 20 is by forming these supports 20 during the tablet compression process illustrated in FIGS. 3*a* to 3*g*, by using an adapted compression stamp. A stamp 6' that is suitable for producing the tablet assembly of FIGS. 5*a* and 5*b* is illustrated in FIG. 7. The stamp 6' is provided with 4 depressions 22 of half-circular shape along the circumference of the stamp's front surface 8. When the compression process shown in FIGS. 3*a*-3*g* is applied with this stamp 6', the compression force realises a plastic deformation of the ring-shaped strip 3 relative to the 4 depressions, resulting in the formation of the supports 20 integral with the bottom portion 3 of the holder 1'.

The height and the planar dimensions of the supports 20 are not limited to any particular value. As an example, for a ring-shaped holder having a diameter of about 17 mm, semi-circular supports 20 may be provided having diameters of about 0.5 mm and a height between 0.02 mm and 0.06 mm. The force required for the formation of the supports by plastic deformation depends on the hardness of the material used for the holder. A material that is commonly used for these holders is SS316, having a Vickers hardness number of 140. Deforming such a material by indentation would require a force of about 1.8 kN. The force applied for compressing the tablet 4 in the method shown in FIGS. 3*a* to 3*g* is upwards of 60 kN, therefore it is clear that the compression process is able to produce the supports 20, when the stamp 6' provided with depressions 22 is used.

The invention is applicable to any other holder type for an electrode tablet of CR batteries besides the holder type 1' shown in the drawings so far. A general characteristic of a holder to which the invention is applicable is that it comprises a bottom portion 3 having a circular circumference. In the ring-shaped holder 1' of the preceding figures, the bottom portion is the ring-shaped strip 3, i.e. besides this strip the bottom of the holder 1' is open. In other holder types, this is not the case, such as for example in the holder type described in previously cited patent publications CN103606684 and CN203553277, in which the bottom portion of the holder comprises a staggered pattern, consisting of parallel strips which are bent repeatedly inward and outward relative to the bottom plane of the holder, i.e. the bottom plane of the bottom portion 3. When the compression process shown in FIGS. 3*a* to 3*g* is applied with this holder type and with a flat stamp 6, the outwardly bent portions of the strips are flattened between the stamp 6 and the bottom 5*a* of the cavity 5, leaving no space for an electrolyte reserve when the holder/tablet assembly is placed in the battery can. When the stamp of FIG. 7 is used, the outwardly bent portions are still flattened, but at the same time the supports 20 are formed on the bottom of the holder, thereby ensuring an empty space when the holder/tablet assembly is installed in the can.

According to an embodiment, the holder 1' shown in the drawings so far could be provided with a mesh inside the inner surface of the ring shaped strip 3 for further improving the ability of holding the compressed cathode tablet.

Figure 8:
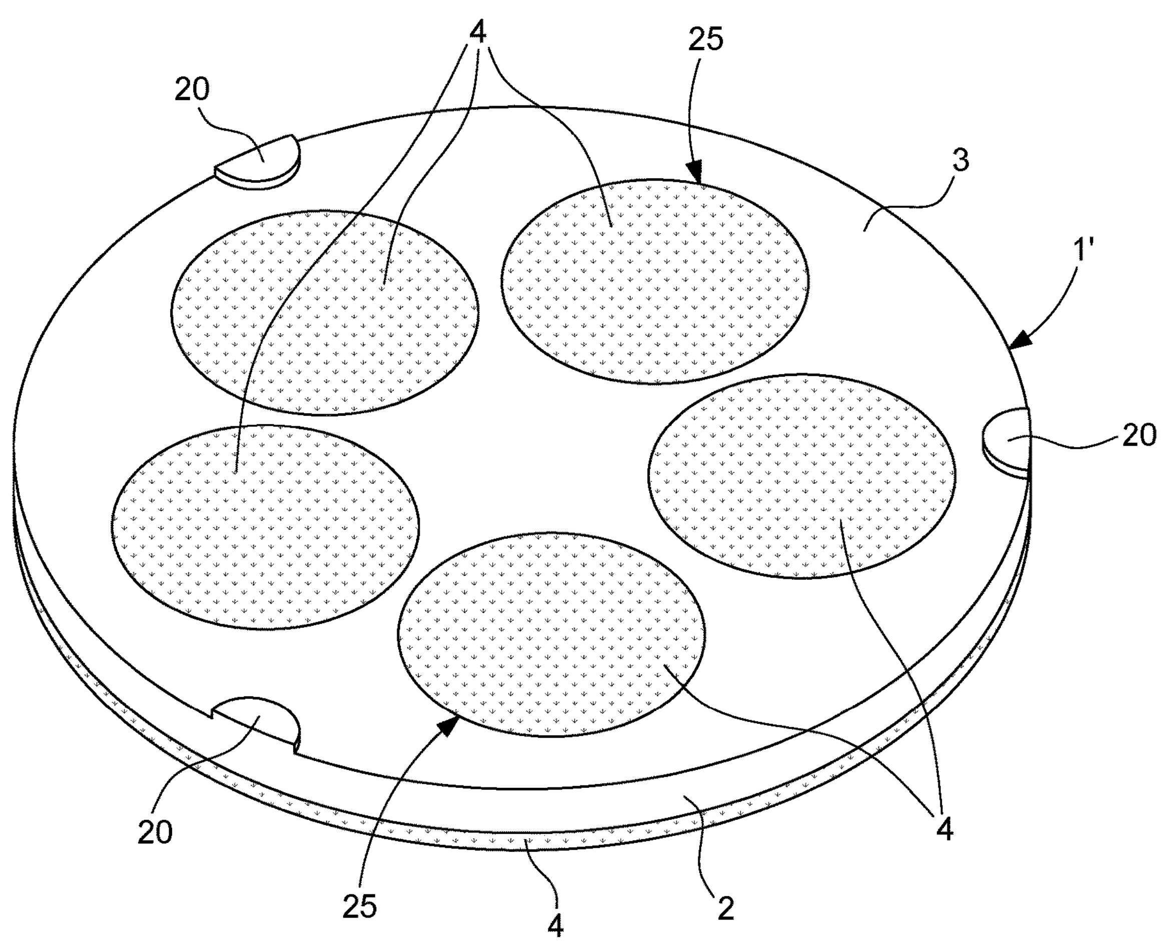
FIG. 8 shows a holder/tablet assembly according to another embodiment of the invention.

FIG. 8 shows a holder/tablet assembly comprising another type of a holder 1' provided with supports 20 in accordance with the present invention. The number of supports 20 is three in the embodiment shown, but could also be four or more. This holder type (without the supports) has been the subject of earlier patent application no 20214346.7, and comprises an upstanding wall 2 and a bottom portion 3 provided with apertures 25, which are preferably equal-sized and regularly distributed on the plane of the bottom surface. For this type of holder, the supports 20 represent the same advantages as described above, i.e. allowing space for the cathode tablet 4 to expand towards the can 12 without losing the electrical connection, and providing the possibility of having an electrolyte reserve.

Figure 9:
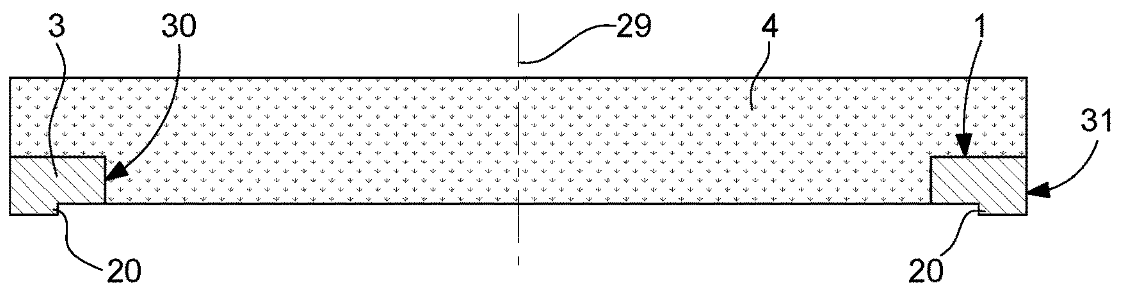
FIG. 9 illustrates a further alternative embodiment of a holder/tablet assembly according to the invention.

FIG. 9 shows a holder/tablet assembly according to another embodiment. The holder 1' now consists only of the bottom portion 3 that has the shape of planar ring having an inner wall 30 and an outer wall 31 arranged around a central axis 29, and wherein the cathode tablet 4 has been partially pressed into the space defined by the inner wall 30 of the bottom portion 3. The thickness of the bottom portion 3 is preferably higher than in the previously shown embodiments, so that sufficient cathode material can be pressed inside the inner wall 30 in order for the cathode tablet 4 to be held in place. The supports 20 can be produced by the method illustrated in FIGS. 3*a*-3*g*, by placing a ring with sufficient thickness inside the cavity 5 on top of a preferably pre-compressed cathode powder, and compressing the powder using a stamp 6' as illustrated in FIG. 7.

According to a further embodiment, the holder may comprise the ring-shaped bottom portion 3 shown in FIG. 9, but further comprising a mesh arranged inside the inner wall 30 of the ring. The mesh will further aid in holding the compressed tablet 4 in place. Instead of a mesh, any other suitable holding structure can be applied, such as a grid forming a staggered pattern of bent strips, as known from CN103606684 and CN203553277. Once again, the supports 20 can be produced by the method illustrated in FIGS. 3*a*-3*g*.

All holder types described above can be used in the compression process shown in FIGS. 3*a* to 3*g* combined with the stamp 6' shown in FIG. 7, for producing a holder/tablet assembly in accordance with the invention. The invention is however not limited to the use of the compression process for producing the supports 20. For example, strips of the holder material could be attached to the bottom surface of the holder, after the standard compression process shown in FIG. 3, said strips forming the supports 20. The supports 20 could also be formed on the holder prior to the compression process, provided that the materials and dimensions of the holder are designed so that the compression process does not substantially deform the bottom portion 3 of the holder relative to the supports.

While the invention has been illustrated and described in detail in the drawings and foregoing description, such illustration and description are to be considered illustrative or exemplary and not restrictive. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An assembly comprising an electrically conductive holder and a tablet-shaped electrode for a button battery, said tablet-shaped electrode having a top surface and a bottom surface, the holder comprising a bottom portion having at least one aperture and a ring shaped wall portion extending from said bottom portion along the periphery of the bottom portion so as to define a housing in which said tablet-shaped electrode is accommodated, the bottom surface of said tablet-shaped electrode resting at least partly onto the bottom portion of the holder, wherein the holder comprises at least three supports protruding outward from said bottom portion in the direction opposite to the wall portion and comprising each an end surface by which the holder may be supported on a planar surface by said supports, said supports being positioned along the circumference of the holder, and wherein the tablet-shaped electrode is arranged in the holder such that the bottom surface of said tablet-shaped electrode and at least part of the bottom portion of the holder are both extended in a different horizontal plane than a horizontal plane in which said supports are extended, said at least part of the bottom portion of the holder and said supports are at the circumference of the holder.

2. The assembly according to claim 1, wherein the supports are integral with the bottom portion.

3. The assembly according to claim 1, wherein the bottom portion is a ring-shaped strip.

4. The assembly according to claim 1, wherein the bottom portion is a continuous plate provided with a plurality of apertures.

5. The assembly according to claim 1, wherein the bottom portion of the holder comprises a holding structure arranged inside the inner wall of the bottom portion.

6. The assembly according to claim 5, wherein said holding structure is a mesh.

7. The assembly according to claim 1, wherein the circumference of the holder is an outermost circumference of the holder.

8. The assembly according to claim 1, wherein the supports are flat along the horizontal plane.

9. The assembly according to claim 1, wherein the at least part of the bottom portion of the holder is stacked, in a direction perpendicular to the horizontal plane, directly on said supports at the circumference of the holder.

10. A method for producing an assembly according to claim 1, the method comprising the steps of:

introducing a powder mixture suitable for the production of said electrode in a cavity defined by a planar bottom and an upstanding round sidewall;

introducing the holder in the cavity with the bottom side up; and compressing the powder mixture by forcing a stamp into the cavity, the stamp having a front surface that contacts the bottom of the holder during the compression step, wherein the front surface of the stamp is provided with a plurality of depressions along the circumference of said front surface, configured to create said supports by plastic deformation of the bottom portion of the holder during the compression step.

11. The method according to claim 10, wherein prior to the compression step, the bottom portion of the holder comprises a holding structure including portions which are bent outwards relative to the bottom plane of said bottom portion, and wherein said outwardly bent portions are flattened during the compression step.

12. A button battery comprising an assembly according to claim 1, the holder comprising a tablet-shaped cathode pressed into the holder, the battery comprising a can, a lid, a separator sheet and an anode, and wherein the holder is placed with its supports in physical contact with the bottom of the can, while the separator sheet and the anode are placed on top of the cathode.

13. The button battery according to claim 12, wherein said battery is a CR battery.

14. The button battery according to claim 12, wherein the at least part of the bottom portion of the holder, at the circumference of the holder, is separated, along the circumference of the holder which is an outermost circumference of the holder, from the bottom of the can by the supports of the holder.

* * * * *